3,097,148
ELECTROPLATING

Joseph L. Greene, Royal Oak, Mich., assignor to General Motors Corporation, Detroit, Mich., a corporation of Delaware
No Drawing. Filed Dec. 7, 1960, Ser. No. 74,237
8 Claims. (Cl. 204—43)

This invention relates to electroplating and more specifically to the electrodeposition of a protective coating containing cadmium and tungsten.

Electrodeposited coatings of cadmium are widely employed as protective finishes for various metals as well as many other relatively highly corrodible metals. Cadmium is a particularly effective protective coating since it cathodically protects the basis metal even at uncoated areas in a manner analogous to the protective action of zinc. However, cadmium has significantly better durability in humid environments containing chlorides and sulfates than other cathodically protective metals, such as zinc.

Cadmium has, therefore, become generally acceptable as a quality protective finish for both functional and decorative hardware which is exposed to industrial and marine environments.

It is an object of this invention to provide a means for producing an improved cadmium-type surface coating. It is a further object of this invention to provide a novel electroplating bath and process for forming an improved cadmium-type protective surface coating. It is a further object of this invention to provide an improved coating composition.

These and other objects, features and advantages of the invention will become more apparent from the following description of preferred embodiments of the invention.

The invention comprehends forming the cadmium-tungsten composition by concurrently electrodepositing tungsten and cadmium to produce a coating containing about 0.1% to 5.2%, by weight, tungsten. The coating is electrodeposited from an alkaline aqueous solution containing cadmium ions, tungstate ions, cyanide ions and citrate ions. The preferred embodiment of the invention involves an aqueous bath solution containing cadmium hydroxide, sodium cyanide, sodium hydroxide, sodium tungstate and sodium citrate as well as a brightener or grain refiner, such as gelatin.

The invention also encompasses an improvement in a cadmium-type surface coating, the improvement being obtained with a cadmium alloy containing tungsten. The improved corrosion-resistant cadmium-tungsten composition is harder than pure cadmium, and using this improved composition as a protective coating on a surface can provide a more wear-resistant corrosion-proof surface.

As indicated above, the significant active ions in my bath solution are the cadmium ions, cyanide ions, tungstate ions and citrate ions. The specific substances employed to produce these ions in the solution are variable. Cadmium ions, for example, can also be introduced into the solution using cadmium hydroxide. However, cadmium cyanide and cadmium oxide can also be used. Potassium cyanide is preferably used to introduce cyanide ions into the solution, but sodium cyanide can be used as a substitute or a supplement. Cadmium cyanide may be used to introduce both cadmium and cyanide ions into the bath solution.

The preferred range in cadmium ion concentration is approximately 0.10 mole per liter to 0.15 mole per liter (about 11 grams per liter to 17 grams per liter of cadmium). However, in some instances a cadmium ion concentration as low as approximately 0.06 mole per liter or as high as approximately 0.2 mole per liter may be preferred. At a cadmium ion concentration below about 0.06 mole per liter no cadmium is deposited from the bath solution, while above about 0.20 mole per liter excessive "drag out" of cadmium occurs, because of high solution viscosity, concentration, etc.

The preferred cyanide ion concentration is predominantly dependent upon the cadmium ion concentration. Satisfactory results are attainable using about 3.5 moles to 5.0 moles of cyanide ion per mole of cadmium ion in the bath. Below a molar relationship of about 3.5 the deposit becomes coarsely crystalline and dendritic, while above a molar relationship of about 5.0 deposition of the alloy ceases and hydrogen is excessively evolved. Best results have been obtained using a cyanide ion to cadmium ion molar relationship of about 4.0 to 4.5.

The concentrations are expressed, herein, as moles or grams per liter in the normal and accepted manner. It is understood that per liter of bath solution is what is referred to.

Analogous to the previous discussion concerning cadmium ions and cyanide ions the tungstate ions and citrate ions can also be introduced into the solution with a variety of substances. While tungstic acid and citric acid can be used, it is preferred, for reasons hereinafter amplified, to employ sodium tungstate and sodium citrate. The tungstate ion concentration can be used to regulate the proportion of tungsten present in the electrodeposited alloy. My bath solution containing approximately 0.15 mole per liter of tungstate ion will produce a coating having a tungsten composition less than about 0.5%. Increased concentrations of the tungstate ion can be used to obtain an increased proportion of tungsten in the electrodeposited coating. In general, it is preferred to employ a tungstate ion concentration of approximately 0.2 mole per liter. Tungstate ion concentrations in excess of about 0.3 mole per liter do not substantially increase the proportion of tungsten in the electrodeposit and produce excessive gas evolution at the electrode. Hence, it is generally undesirable to use concentrations in excess of about 0.3 mole per liter.

The preferred molar concentration of the citrate ion is predominantly dependent upon the concentration of the tungstate ion. Satisfactory results can be obtained with a citrate ion to tungstate ion molar ratio of approximately 0.3 to 0.7. Best results have been obtained employing a citrate ion to tungstate ion molar ratio of about 0.5 to 0.6.

The bath solution is alkaline in character and has a pH of at least 10 to avoid danger of liberating hydrogen cyanide. Moreover, below this pH the deposit formed is of a poor quality, being coarse, dull and frequently nonadherent. Although solutions having a pH between approximately 10 and 12.5 can be used, best results have been obtained employing a pH of about 11.4 to 12.0.

As hydrogen cyanide can be liberated by mixing a cyanide salt in an acid aqueous solution, the manner in which the bath is compounded should be conducted with this in mind. If tungstic acid and citric acid are used to supply, respectively, the tungstate ion and citrate ion in the bath solution, the bath solution should first be made alkaline, preferably with a strong alkali, such as potassium hydroxide or sodium hydroxide. Thus, although a number of substances can be used to supply the significant active ion concentrations disclosed herein, the compounding of the bath solution should be performed so as to maintain the solution at a pH above about 10 from the time the cyanide ion-producing salt is introduced.

Glue or gelatin, licorice extract, caffein, etc. can be used in the bath solution as a brightener and grain refiner for the electrodeposited coating. The specific concentration of the brightener used generally depends upon the nature of the material. Glue or gelatin, for example, provides satisfactory results at concentrations of approximately 0.25 gram per liter to 0.5 gram per liter.

My invention can be used to deposit a cadmium-tungsten alloy coating with an aqueous bath solution compounded as follows:

| | |
|---|---|
| Cadmium hydroxide _____grams per liter__ | 16–20 |
| Sodium tungstate _____do____ | 64–72 |
| Sodium hydroxide _____do____ | 3–10 |
| Potassium cyanide _____do____ | 30–40 |
| Sodium citrate _____do____ | 20–30 |
| Glue or gelatin _____do____ | 0.25–0.5 |
| pH _____ | 10–12.5 |

The bath solution formulated above is preferably used at a temperature of approximately 78° F. to 130° F. using a cathode current density of approximately 20 amperes per square foot to 45 amperes per square foot. Tungsten, graphite or iron anodes can be employed along with cathode rod agitation.

Although an alloy coating can be produced at room temperature, a higher proportion of tungsten can be produced in the coating when higher operating temperatures are used. On the other hand, temperatures in excess of 140° F. do not provide substantial increases in the proportion of tungsten and, in addition, produce the adverse effect of hydrolyzing the addition agents, leading to increasingly grainy or dendritic deposits. In general, it is preferred to use an operating temperature of approximately 120° F. to 130° F.

The preferred cathode current density used is approximately 20 amperes per square foot to 45 amperes per square foot. Below approximately 15 amperes per square foot metal deposition ceases. In some instances it may be preferred to employ a current density up to as high as 50 amperes per square foot. However, above this cathode current density the deposit may "burn" and coarse dendrites be produced.

It is desirable that the bath solution be agitated during deposition. However, it is not advisable to use air agitation, as this accelerates oxidation of the cyanide ion. Mechanical agitation, especially cathodic agitation, is quite satisfactory.

Tungsten, graphite, iron or steel anodes can be used. In addition, cadmium-tungsten alloy anodes can be employed to form a self-regulating plating system. My bath solution is particularly satisfactory for commercial production purposes since the citrate and cyanide ions do not appear to be consumed by electrolysis. However, since cyanide may be lost by air oxidation, periodic replenishment of the cyanide ion is required over extended durations of time. The bath is inherently resistant to rapid pH changes due to an extensive buffering action of the bath ingredients. Accordingly, the bath maintains a fairly stable pH with considerable use over long periods of time.

Cadmium alloys containing about 0.1% to 5.2% tungsten have been produced with my bath solution. However, it is preferred to produce a cadmium alloy containing about 2% to 5% tungsten. As previously indicated, the tungsten content in the deposited alloy can be affected by varying the operating temperature of the bath solution and by varying the tungstate ion concentration. The following table is used to provide specific examples of the manner in which the tungstate ion concentration can affect tungsten content in the electrodeposited alloy:

| | Plate Containing 1% Tungsten | Plate Containing 3% Tungsten | Plate Containing 5% Tungsten |
|---|---|---|---|
| Cadmium Hydroxide_____grams__ | 22.0 | 22.0 | 22.0 |
| Sodium Tungstate_____do____ | 52.8 | 69.3 | 92.5 |
| Sodium Hydroxide_____do____ | 6.0 | 6.0 | 6.0 |
| Sodium Cyanide_____do____ | 29.4 | 29.4 | 29.4 |
| Sodium Citrate_____do____ | 23.2 | 31.0 | 38.6 |
| Gelatin_____do____ | 0.5 | 0.5 | 0.5 |
| Water_____liter__ | 1 | 1 | 1 |
| Temperature_____° F__ | 90 | 115 | 125 |
| Current Density_____a.s.f__ | 25 | 30 | 35 |

These bath solutions were used with steel anodes and deposited the cadmium-tungsten alloy to a thickness of about 0.0008 inch in about 45 minutes.

It is to be understood that although this invention has been described in connection with certain specific examples, no limitation is intended thereby except as defined in the appended claims.

I claim:

1. An alkaline aqueous bath solution for the electrodeposition of a cadmium-tungsten coating, said bath solution containing about 0.06 mole per liter to 0.2 mole per liter of cadmium ion, about 3.5 moles to 5.0 moles of cyanide ion per mole of cadmium ion, about 0.15 mole per liter to 0.3 mole per liter of tungstate ion and about 0.3 mole to 0.7 of citrate ion per mole of tungstate ion.

2. An alkaline aqueous bath solution for the electrodeposition of a cadmium-tungsten coating, said bath solution containing about 0.1 mole per liter to 0.15 mole per liter of cadmium ion, about 4.0 moles to 4.5 moles of cyanide ion per mole of cadmium ion, about 0.20 mole per liter to 0.25 mole per liter of tungstate ion and about 0.5 mole to 0.6 mole of citrate ion per mole of tungstate ion.

3. An alkaline aqueous bath solution for the electrodeposition of a cadmium-tungsten coating, said bath solution containing about 0.06 mole per liter to 0.2 mole per liter of cadmium ion produced by at least one of the substances from the group consisting of cadmium hydroxide, cadmium oxide and cadmium cyanide, about 3.5 moles to 5.0 moles of cyanide ion per mole of cadmium ion, said cyanide ion produced by at least one of the substances of the group consisting of potassium cyanide, sodium cyanide and cadmium cyanide, about 0.15 mole per liter to 0.3 mole per liter of tungstate ion produced by at least one of the substances from the group consisting of sodium tungstate and tungstic acid, about 0.3 mole to 0.7 mole of citrate ion per mole of tungstate ion, said citrate ion being produced by at least one of the substances from the group consisting of sodium citrate, potassium citrate and citric acid, and sufficient alkali to produce a bath solution having a pH above about 10.

4. An alkaline aqueous bath solution for the electrodeposition of a cadmium-tungsten alloy coating, said bath solution having a pH of about 10 to 12.5 and containing about 16 grams per liter to 20 grams per liter of cadmium hydroxide, about 64 grams per liter to 72 grams per liter of sodium tungstate, about 3 grams per liter to 10 grams per liter of sodium hydroxide, about 30 grams per liter to 40 grams per liter of potassium cyanide, about 20 grams per liter to 30 grams per liter of sodium citrate and about 0.25 gram per liter to 0.5 gram per liter of brightener.

5. The method of electrodepositing a cadmium-tungsten alloy coating, said method comprising the steps of placing a workpiece and a suitable anode in contact with a bath solution containing about 0.06 mole per liter to 0.2 mole per liter of cadmium ion, about 3.5 moles to 5.0 moles of cyanide ion per mole of cadmium ion, about 0.15 mole per liter to 0.3 mole per liter of tungstate ion and about 0.3 mole to 0.7 mole of citrate ion per mole of tungstate ion, imposing a negative potential on said workpiece and depositing onto said workpiece a cadmium-tungsten alloy coating.

6. The method of electrodepositing a cadmium-tungsten alloy coating, said method comprising the steps of immersing a workpiece and a suitable anode in a bath solution containing about 0.1 mole per liter to 0.15 mole per liter of cadmium ion, about 4.0 moles to 4.5 moles of cyanide ion per mole of cadmium ion, about 0.20 mole per liter to 0.25 mole per liter of tungstate ion and about 0.5 mole to 0.6 mole of citrate ion per mole of tungstate ion, imposing a negative potential on said workpiece and depositing onto said workpiece a cadmium-tungsten alloy coating.

7. The method of depositing a cadmium base alloy coating, said method comprising the steps of placing a workpiece and a suitable anode in contact with an alkaline aqueous bath solution containing about 0.06 mole per liter to 0.2 mole per liter of cadmium ion produced by at least one of the substances from the group consisting of cadmium hydroxide, cadmium oxide and cadmium cyanide, about 3.5 moles to 5.0 moles of cyanide ion per mole of cadmium ion, said cyanide ion produced by at least one of the substances of the group consisting of potassium cyanide, sodium cyanide and cadmium cyanide, about 0.15 mole per liter to 0.3 mole per liter of tungstate ion produced by at least one of the substances from the group consisting of sodium tungstate and tungstic acid, about 0.3 mole to 0.7 mole of citrate ion per mole of tungstate ion, said citrate ion being produced by at least one of the substances from the group consisting of sodium citrate, potassium citrate and citric acid, and sufficient alkali to prdouce a bath solution having a pH above about 10, maintaining said bath solution at a temperature of from about room temperature to 140° F. and applying a negative potential to said workpiece so as to induce thereon a cathode current density of approximately 15 amperes per square foot to 50 amperes per square foot and deposit a cadmium-tungsten alloy coating on said workpiece.

8. The method of depositing a cadmium base alloy coating, said method comprising the steps of placing a workpiece and a suitable anode in contact with an alkaline aqueous bath solution containing about 0.06 mole per liter to 0.2 mole per liter of cadmium ion produced by at least one of the substances from the group consisting of cadmium hydroxide, cadmium oxide and cadmium cyanide, about 3.5 moles to 5.0 moles of cyanide ion per mole of cadmium ion, said cyanide ion produced by at least one of the substances of the group consisting of potassium cyanide, sodium cyanide and cadmium cyanide, about 0.15 mole per liter to 0.3 mole per liter of tungstate ion produced by at least one of the substances from the group consisting of sodium tungstate and tungstic acid, about 0.3 mole to 0.7 mole of citrate ion per mole of tungstate ion, said citrate ion being produced by at least one of the substances from the group consisting of sodium citrate, potassium citrate and citric acid, and sufficient alkali to produce a bath solution having a pH above about 10, imposing a negative potential on said workpiece and depositing onto said workpiece a cadmium-tungsten alloy coating.

References Cited in the file of this patent

UNITED STATES PATENTS 2,160,321    Armstrong et al. _____ May 30, 1939

FOREIGN PATENTS 691,501    Germany _____ May 28, 1950

OTHER REFERENCES

Holt, Journal of the Electrochemical Society, volume 72, 1937, pages 301–309.

Vaaler et al., Journal of the Electrochemical Society, volume 90, 1946, pages 43–54.

Clark et al., Journal of the Electrochemical Society, volume 99, 1952, pages 245–249.